(12) United States Patent  
Barraclough et al.

(10) Patent No.: US 7,451,613 B2
(45) Date of Patent: Nov. 18, 2008

(54) FROZEN FOOD APPLIANCE

(75) Inventors: James R Barraclough, Waterbury, CT (US); Chi Wah Leung, Kowloon (HK); Zhi He Hu, Shenzhen (CN)

(73) Assignee: Conair Corporation, Stamford, CT (US)

( * ) Notice: Subject to any disclaimer, the term of this patent is extended or adjusted under 35 U.S.C. 154(b) by 490 days.

(21) Appl. No.: 11/270,927

(22) Filed: Nov. 12, 2005

(65) Prior Publication Data

US 2006/0112716 A1 Jun. 1, 2006

Related U.S. Application Data

(60) Provisional application No. 60/627,703, filed on Nov. 11, 2004.

(51) Int. Cl.
*A23G 9/12* (2006.01)
(52) U.S. Cl. .................... 62/343; 99/455; 222/146.6; 366/309
(58) Field of Classification Search ........... 62/342–343; 99/455, 494; 222/129, 129.1, 146.6; 366/144, 366/309

See application file for complete search history.

(56) References Cited

U.S. PATENT DOCUMENTS

| | | | | | |
|---|---|---|---|---|---|
| 4,796,440 | A | * | 1/1989 | Shiotani et al. | 62/343 |
| 4,817,827 | A | * | 4/1989 | Kito et al. | 222/238 |
| 4,910,973 | A | * | 3/1990 | Osrow et al. | 62/342 |
| RE34,465 | E | * | 12/1993 | Koeneman et al. | 62/379 |
| 5,794,820 | A | * | 8/1998 | Shabbits et al. | 222/307 |
| 6,145,701 | A | * | 11/2000 | Van Der Merwe et al. | 22/40 |
| 6,205,806 | B1 | * | 3/2001 | Huang | 62/343 |
| 6,301,919 | B1 | * | 10/2001 | Blaustein et al. | 62/345 |
| 7,290,682 | B2 | * | 11/2007 | Harra | 222/146.6 |
| 7,318,324 | B2 | * | 1/2008 | Ulrich et al. | 62/342 |
| 7,325,413 | B2 | * | 2/2008 | Ball | 62/342 |

* cited by examiner

*Primary Examiner*—William E Tapolcai
(74) *Attorney, Agent, or Firm*—Lawrence Cruz

(57) ABSTRACT

A frozen food appliance for making and dispensing frozen food products comprising a base, a removable container adapted to be chilled in a conventional freezer and then replaced into the base, a dispensing nozzle and associated control lever, an automatic scraper, auger and paddle for delivering frozen food product from the container and out of the dispensing spout, and a toppings dispenser for automatically delivering toppings to the frozen food product while or after the frozen food product is being dispensed.

12 Claims, 19 Drawing Sheets

FROZEN FOOD APPLIANCE

CROSS-REFERENCE TO RELATED APPLICATIONS

This application claims priority to U.S. Provisional Patent Application Ser. No. 60/627,703 filed on Nov. 11, 2004, incorporated herein by reference in its entirety.

BACKGROUND OF THE INVENTION

1. Field of the Invention

The present invention relates to food appliances and, more particularly, to a frozen food appliance for making and dispensing frozen food products such as ice cream or sorbet with a variety of toppings.

2. Description of Related Art

Various frozen food dispensers for preparing and dispensing frozen food products such as ice cream and sorbet exist on the market. Among these products are products that utilize a removable bowl-like container that is designed to be frozen in a conventional freezer. Later, the container is removed from the freezer and, while retaining a cold temperature, is loaded with food ingredients for ice cream or sorbet. These ingredients can include, for example, milk, sugar, heavy cream, flavoring and/or coloring. The container chills the ingredients to produce the desired frozen food product.

Such known designs require the user to scoop out the finished product with a spoon or scooper to transfer it to an eating plate, bowl or cone. They do not allow for an easy and efficient method for transferring the ice cream. Also, if condiments or toppings are desired, the user then applies those manually. These designs do not enable a user to automatically dispense the ice cream or sorbet while simultaneously mixing in a variety of toppings, such as sprinkles, peanuts and various candies, for example.

OBJECT AND SUMMARY OF THE INVENTION

It is an object of the present invention to overcome the shortcomings of the prior art mentioned above. These and other objectives are achieved by the present invention described herein.

It is desirable to provide an automatic dispensing appliance for the frozen food product and for the toppings that overcomes the shortcomings of the known devices described above. It is a further object to provide such an appliance with a self-scraping mechanism to thoroughly and efficiently scoop out the chilled container and quickly deliver the frozen food product to a dispensing spout. These and other objects are achieved by the present invention.

A preferred embodiment of the present invention, as described herein, comprises a base, a removable container adapted to be chilled in a conventional freezer and then replaced into the base, a dispensing spout and associated control lever, an automatic scraper, auger and paddle assembly for delivering frozen food product from the container and out of the dispensing spout, and a topping dispenser for automatically delivering toppings to the frozen food product while or after it is dispensed.

DETAILED DESCRIPTION OF THE INVENTION

Figure 1:
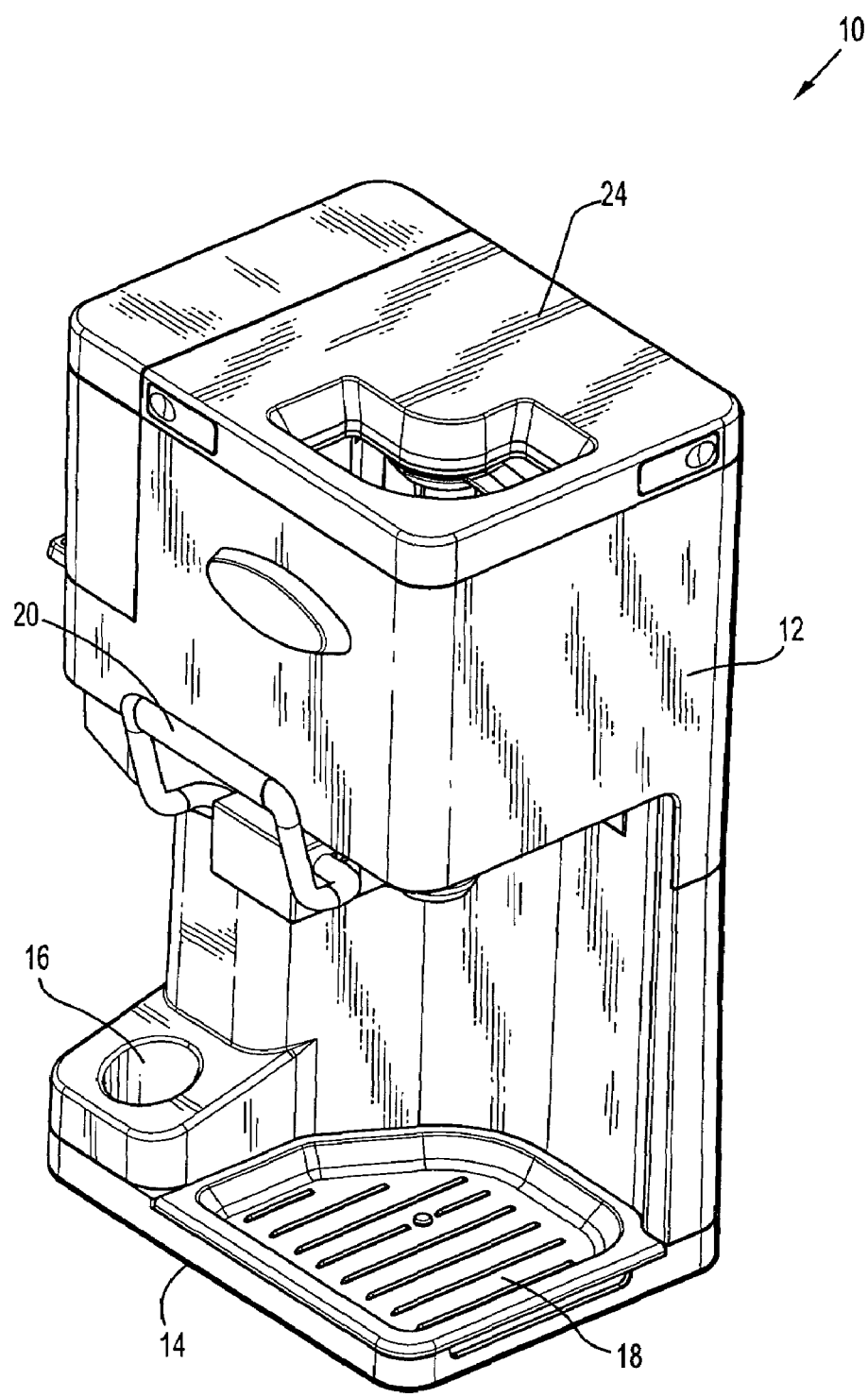
FIG. 1 is a perspective view of an appliance in accordance with an illustrative embodiment of the present invention.
Figure 2A:
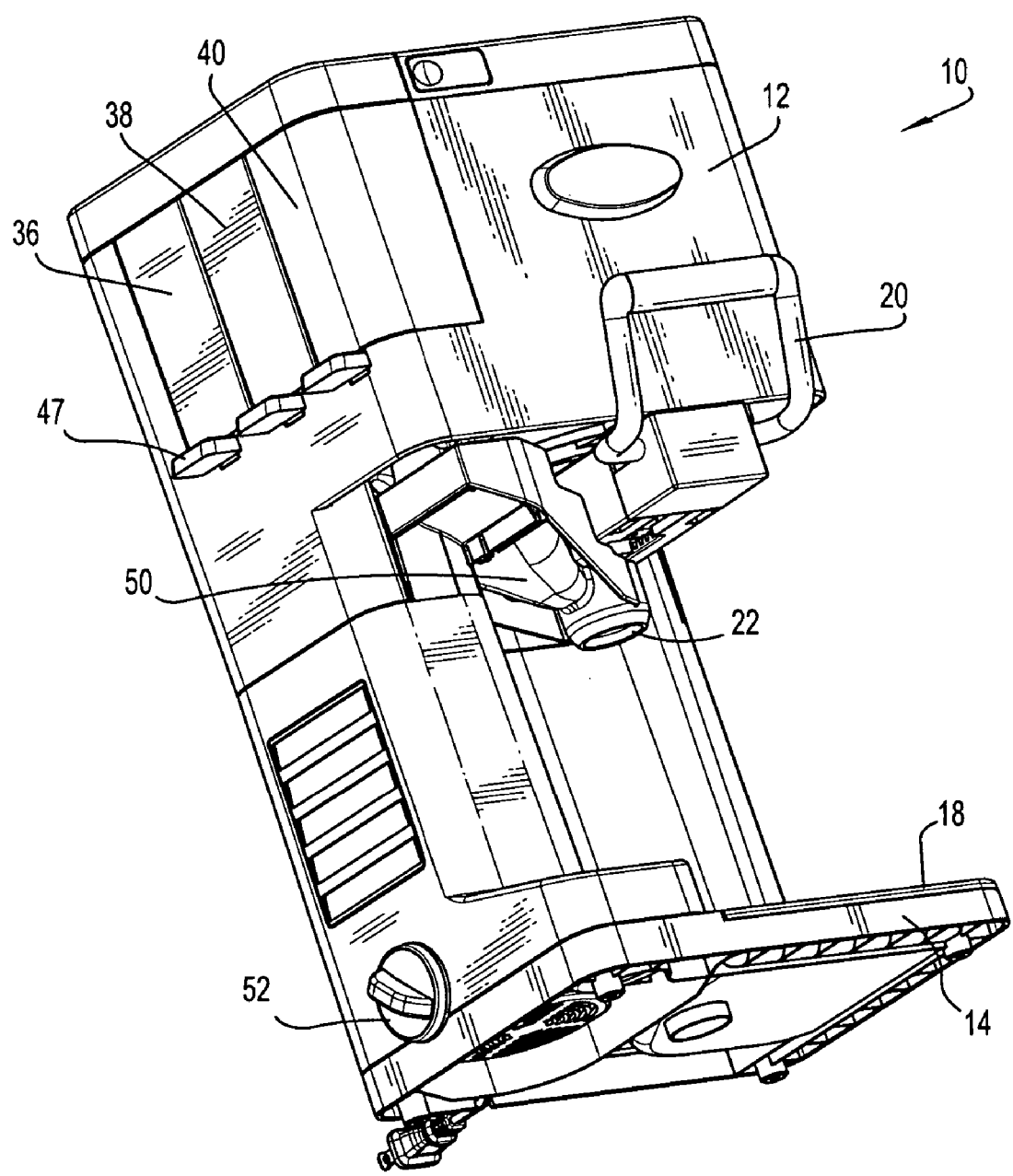
FIG. 2A and 2B are perspective side views of the appliance shown in FIG. 1.
Figure 2B:
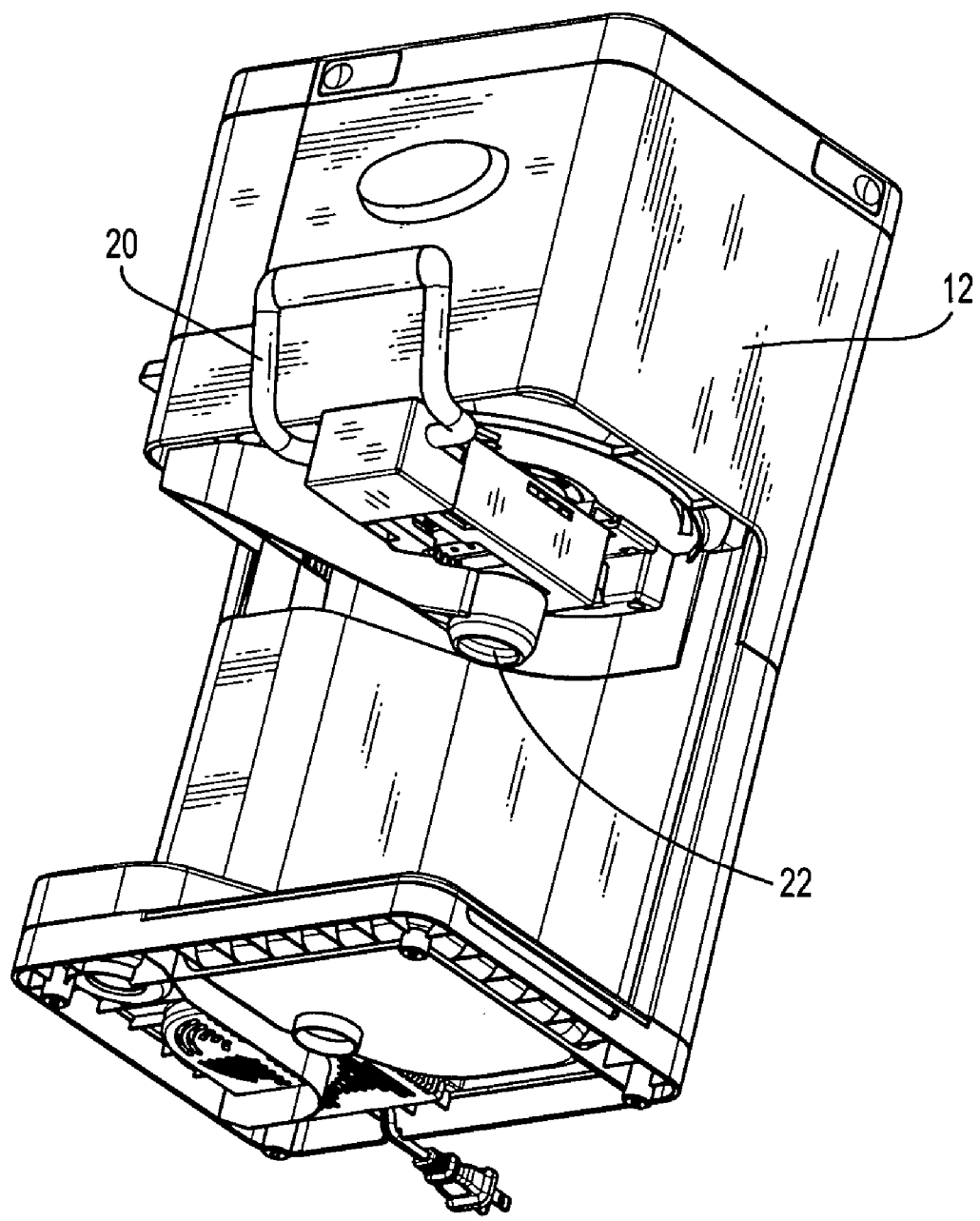

The appliance 10 according to the present invention is shown in FIGS. 1, 2A and 2B and preferably comprises a housing 12 having a base 14, a drip tray 18, a dispensing lever 20, a dispensing nozzle 22, a removable lid 24, a cone holder 16, an on/off 52 and one or more toppings dispensers 36, 38, 40. The drip tray 18 is located on a portion of the base 14 and is used for catching any excess runoff of frozen food product. The drip tray 18 can also support a bowl or container (not shown) into which ice cream or sorbet, or some other frozen food product, is dispensed.

In a preferred embodiment, a cone holder 16 may hold cones (not shown) into which frozen food product may be dispensed. The cone holder 16 can hold a single type of cone or may have grooves or indentures to enable the housing 12 to retain two or more types of cones. A dispensing lever 20 is associated with a dispensing nozzle 22 to dispense ice cream or other types of frozen food product. In a preferred embodiment, the dispensing lever 20 is in the form of an upside-down "U" as shown. However, other shapes and sizes can be used to obtain similar results. A main on/off switch 52 can be located on the side of the housing 12 as shown, or at any other location, to enable a user to selectively provide power to the appliance 10. The top of the housing 12 can have a removable lid 24 capable of being opened or removed. Various topping dispensers 36, 38, 40 can be utilized for automatically delivering toppings to the frozen food product while or after it is dispensed.

Figure 3:
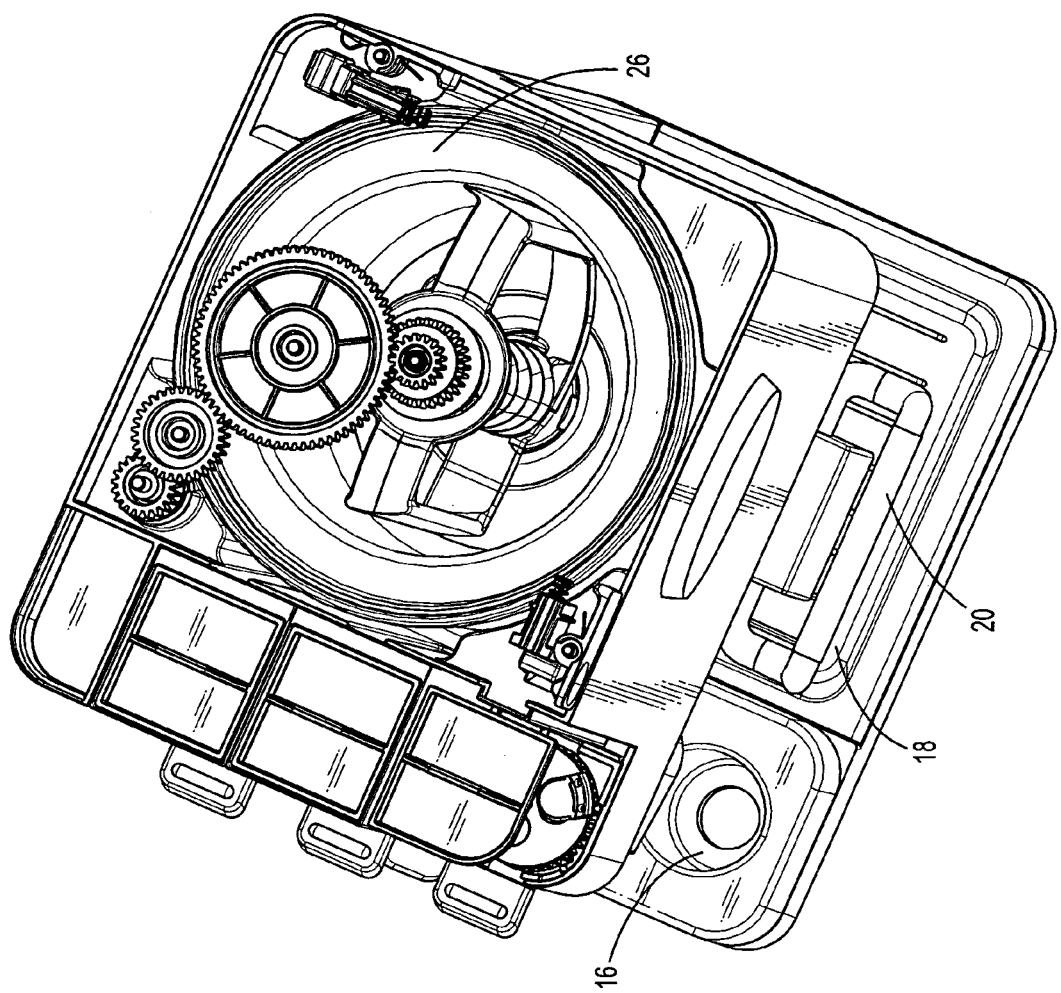
FIG. 3 is a partial top sectional view of the appliance shown in FIG. 1 with the illustrative embodiment of the removable container within the housing.
Figure 4:
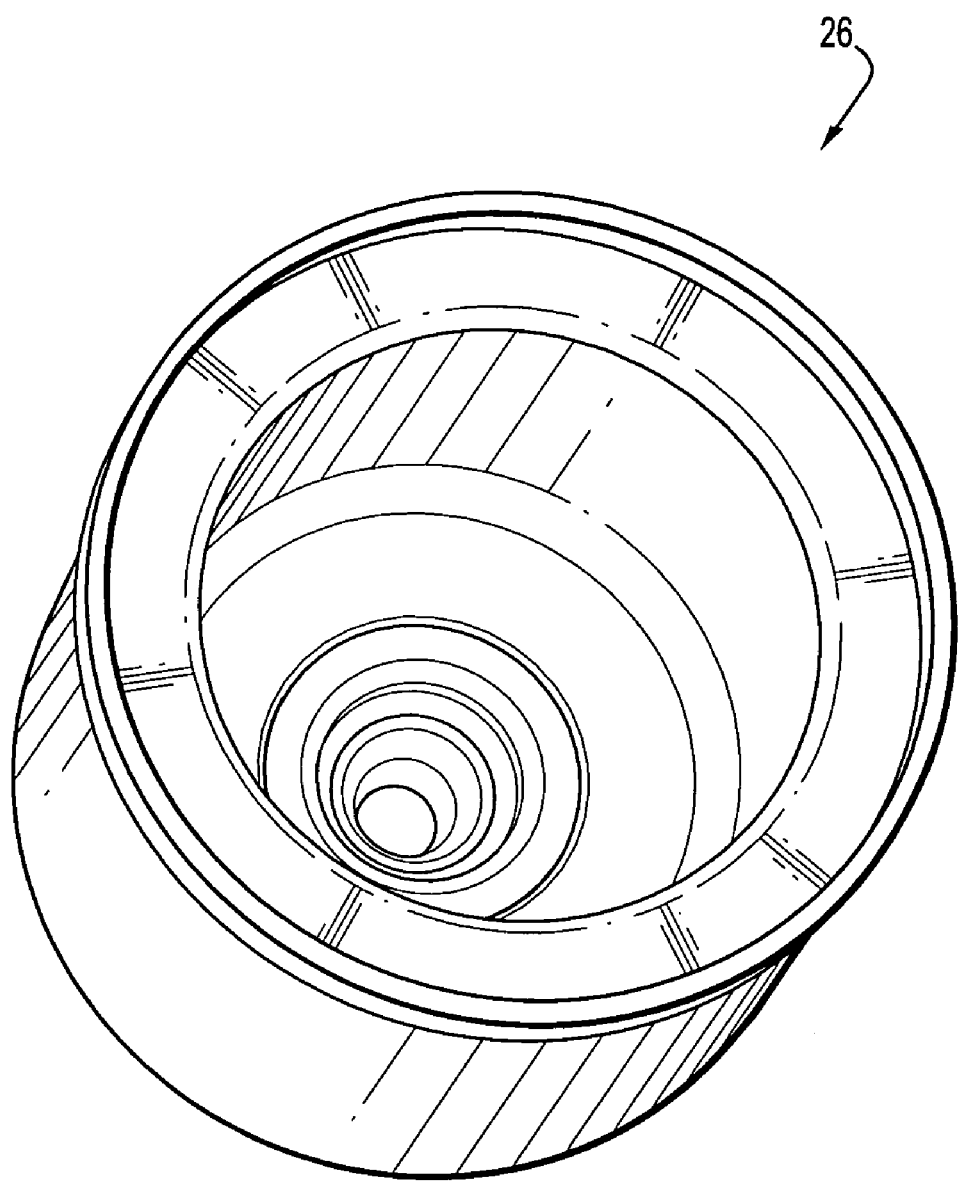
FIG. 4 is a perspective view of the removable container of FIG. 3.
Figure 5:
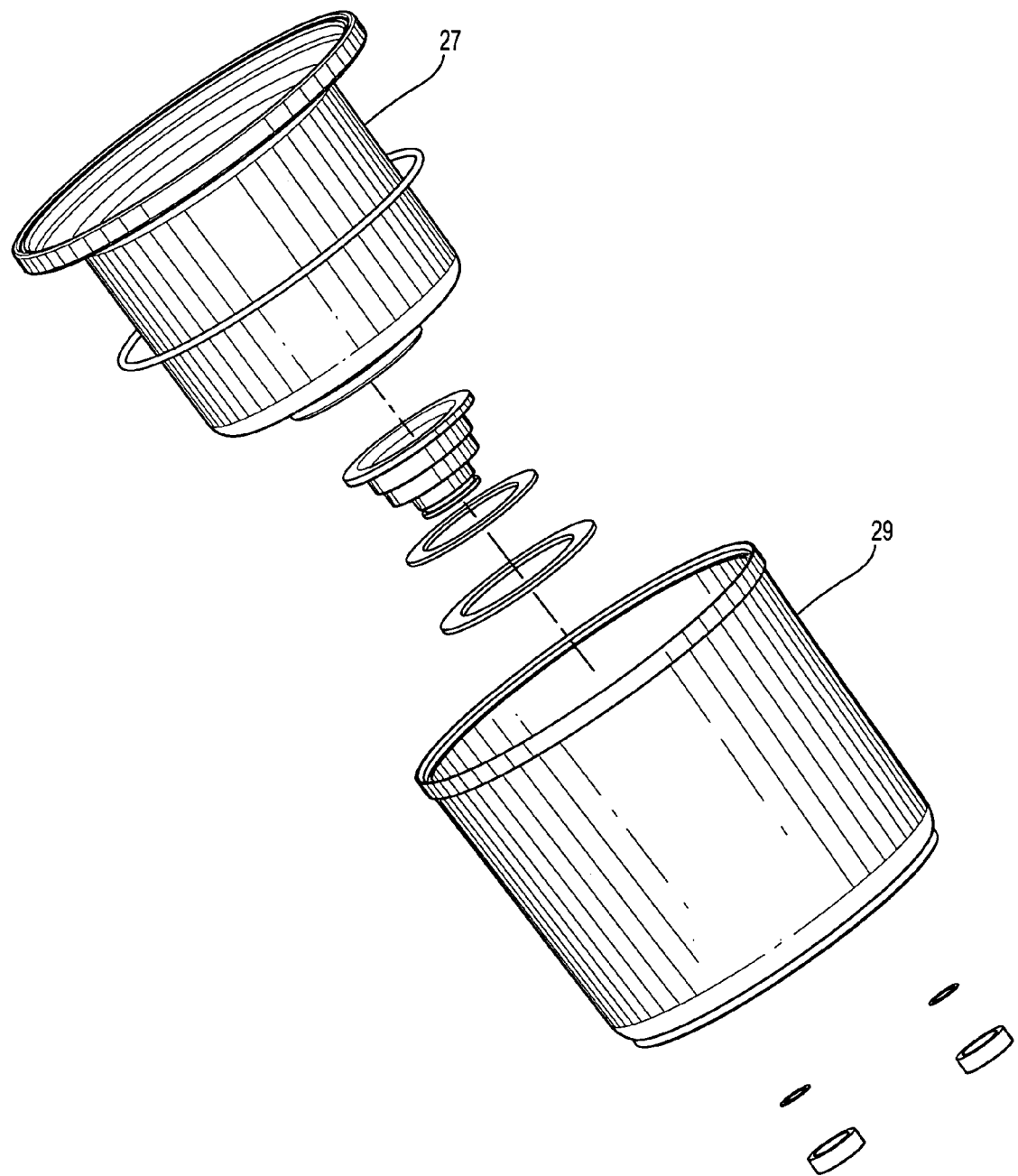
FIG. 5 is exploded view of the removable container in accordance with an illustrative embodiment of the appliance of FIG. 1.

The removable lid 24 can be opened in order to remove and/or replace a removable container 26, as shown in FIGS. 3-5. This removable lid 24 can be made to be sealed watertight to the housing 12. The container 26 preferably has a double-wall construction having an inner portion 27 and an outer portion 29. The container 26 may be filled with a thermal retention material to retain cold after the container 26 is placed into a conventional freezer (not shown). The chilled container 26 can be loaded into the appliance 10 after being chilled and can then be loaded with ingredients to make ice cream, sorbet, or similar frozen food product. These ingredients can include, for example, milk, sugar, heavy cream, flavoring and/or coloring. The chilled food product is then dispensed from the nozzle 22 by manipulating the dispensing lever 20.

Figure 6:
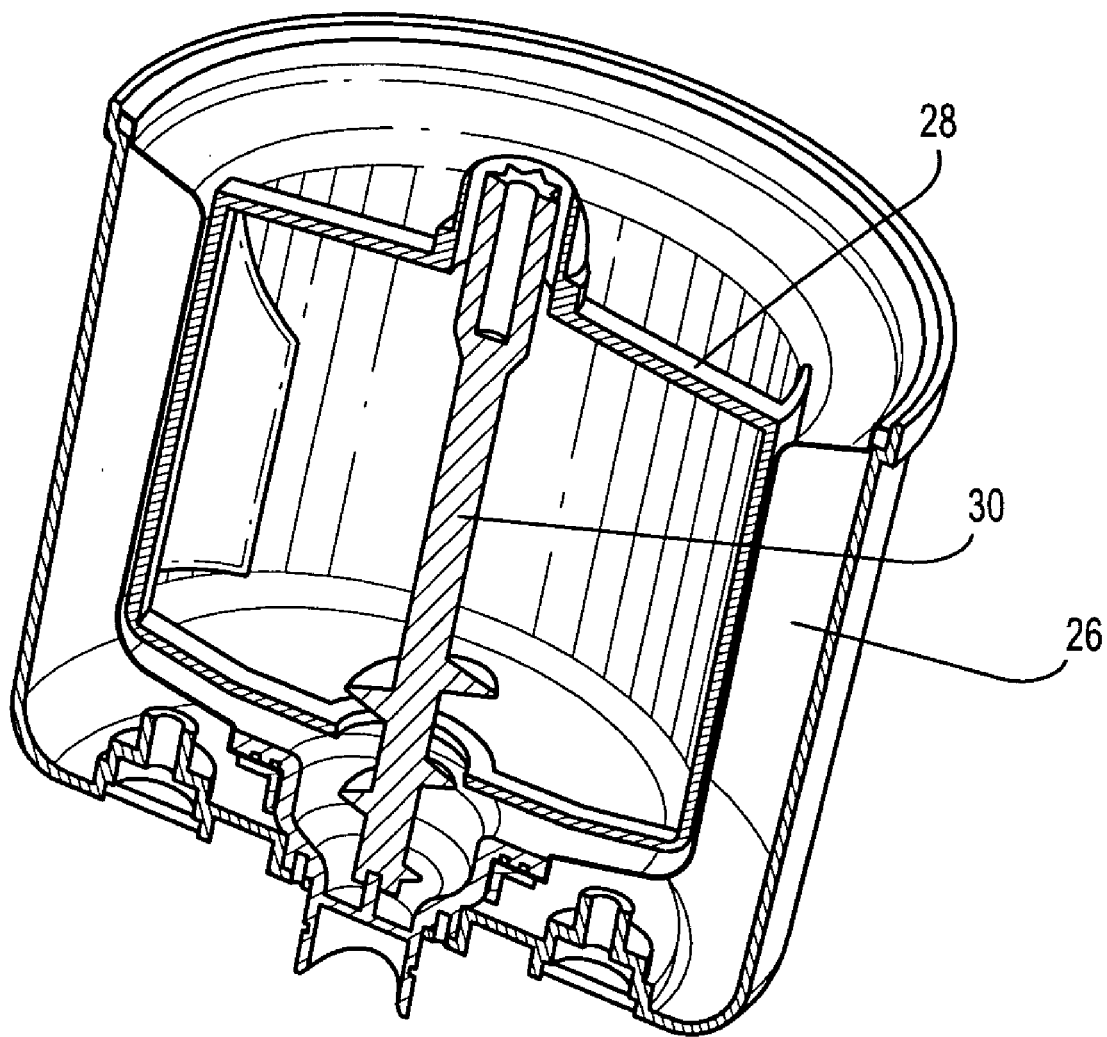
FIG. 6 is a cross-sectional view of the removable container with blade and auger assembled therein in accordance with an illustrative embodiment of the appliance shown in FIG. 1.
Figure 7:
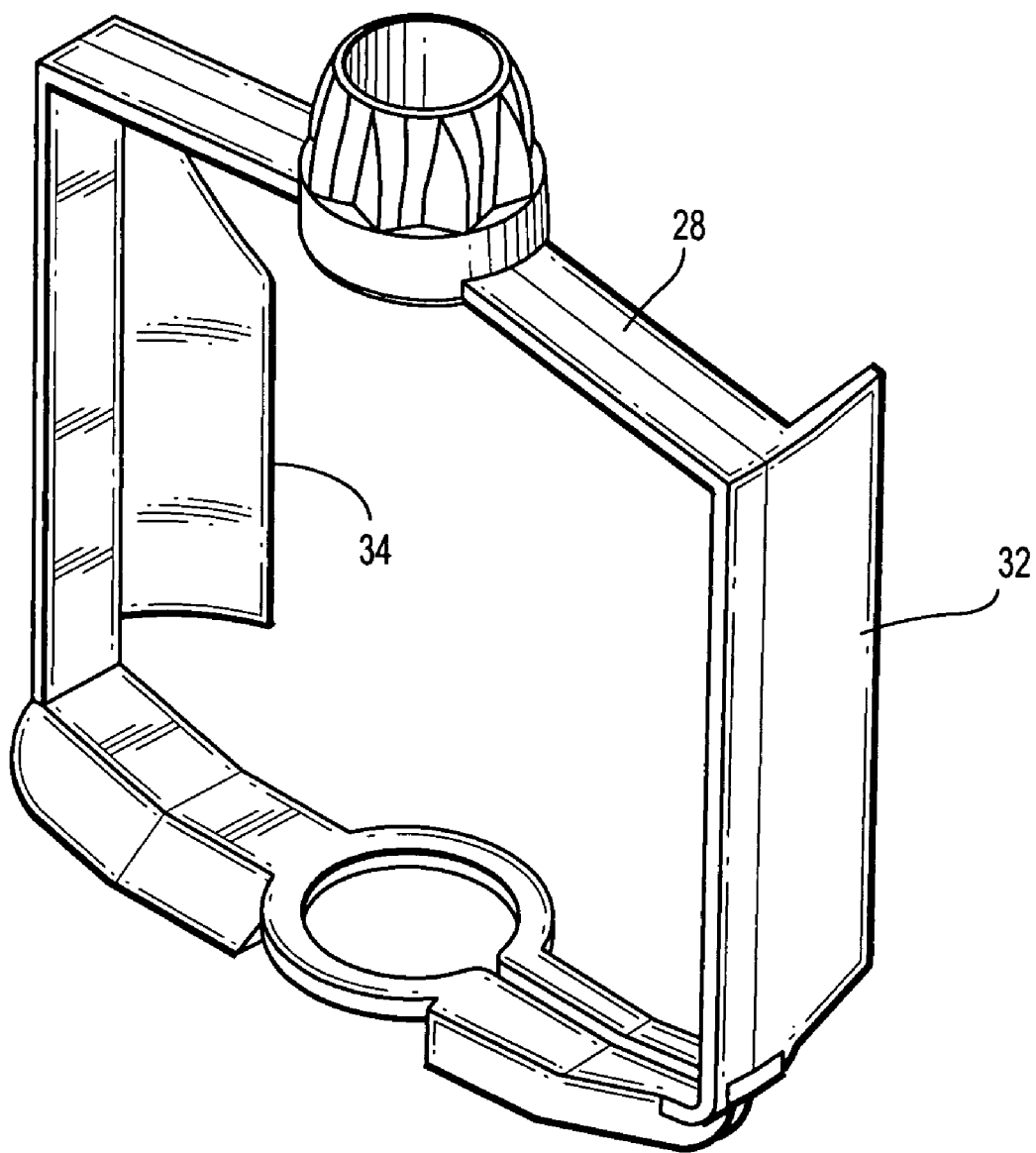
FIG. 7 is a perspective view of the blade in accordance with an illustrative embodiment of the appliance shown in FIG. 1.
Figure 8:
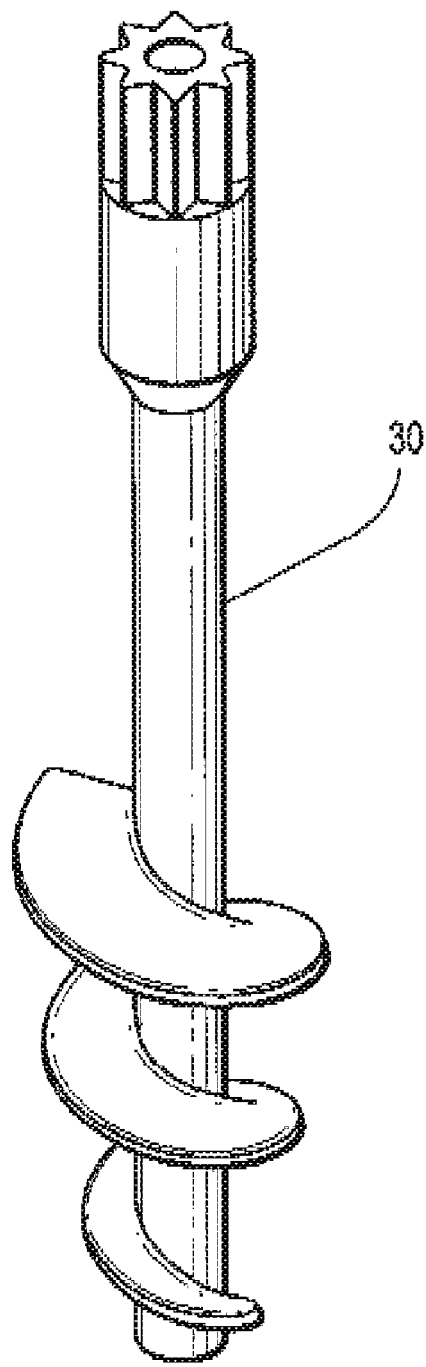
FIG. 8 is perspective view of the auger in accordance with an illustrative embodiment of the appliance shown in FIG. 1.

In a preferred embodiment, a rotating blade 28 and auger 30 are located inside the container 26, as shown in FIGS. 6-8. This rotating blade 28 continuously rotates to loosen frozen food product from the inside walls of the container 26 and to direct the food product to the auger 30 that is positioned in the center of the container 26. The blade 28 includes a scraper 32 for scraping the frozen food product from the sides of the frozen container, and a diverter 34, which diverts or directs the food product toward the center of rotation of the blade 28 where the auger 30 is located. The auger 30 directs the food product down toward the dispensing nozzle 22.

The auger 30 and the blade 28 preferably rotate in response to rotation of a master gear and motor of a conventional type, by transmission through various gears 31. An example of a portion of this assembly can be seen in FIG. 9. The gearing system is preferably designed to have the auger 30 rotate faster than the blade 28, which produces optimum performance. The auger 30 can also be fabricated to contain a significant number of auger turns so that the ice cream does not break off as it is being dispensed from the dispensing nozzle 22.

The auger 30 and the blade 28 preferably rotate in response to rotation of a master gear and motor of a conventional type, by transmission through various gears 31. An example of a portion of this assembly can be seen in FIG. 9. The gearing system is preferably designed to have the auger 30 rotate faster than the blade 28, which produces optimum performance. The auger 30 can also be fabricated to contain a significant number of auger turns so that the ice cream does not break off as it is being dispensed from the dispensing nozzle 22.

Figure 9:
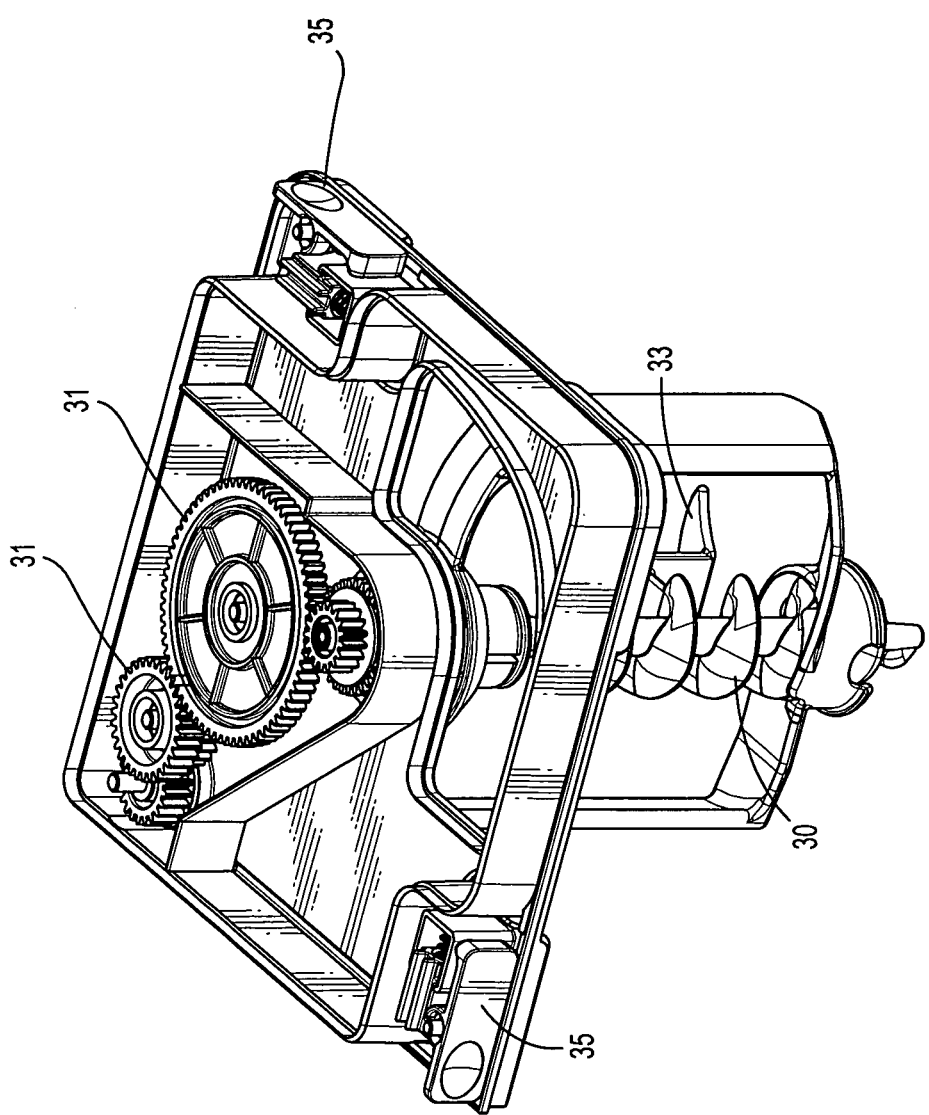
FIG. 9 is a perspective view of the blade, auger and paddle, along with the associated gearing assembly in accordance with an illustrative embodiment of the appliance shown in FIG. 1.
Figure 10:
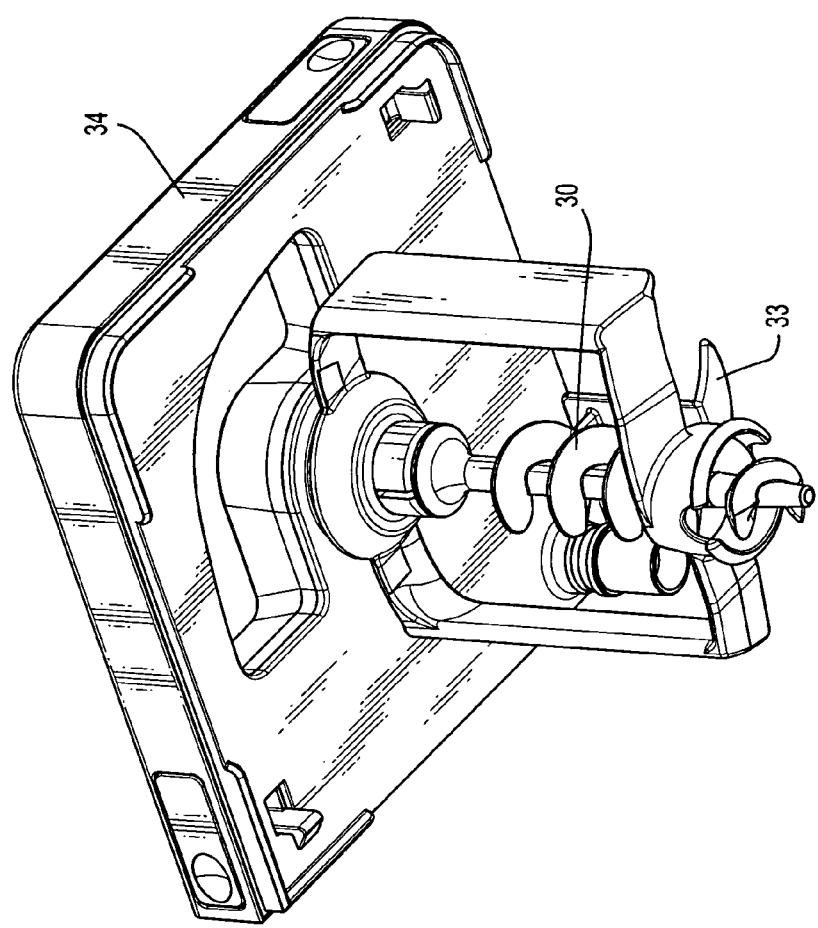
FIG. 10 is a bottom perspective view of the blade, auger and paddle assembly in accordance with an illustrative embodiment of the appliance shown in FIG. 1.
Figure 11:
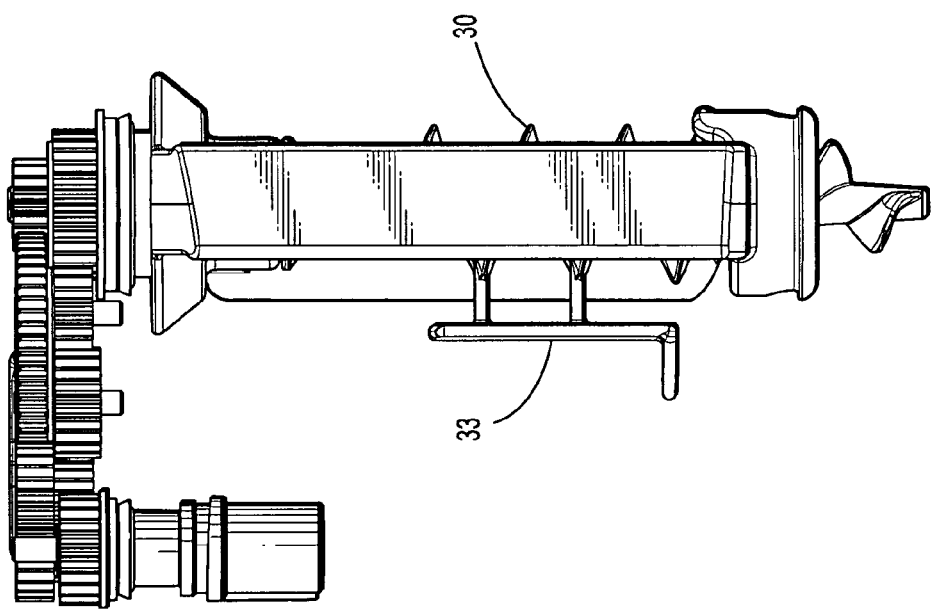
FIG. 11 is a side view of the blade, auger and paddle, along with the associated gearing assembly in accordance with an illustrative embodiment of the appliance shown in FIG. 1.

In a preferred embodiment, a paddle 33 is attached to the blade 28, as shown in FIGS. 9-11. This paddle 33 can be used break up the ice cream within the container 26 and in one embodiment, is in the shape of an "L." However, other shapes that accomplish the same objective are also contemplated. The paddle 33 also rotates about the central axis of the container/blade combination. The paddle 33 can be made to operate at different speeds from the auger 30 and in opposite directions. FIGS. 9 and 10 also show the spring-loaded latches 35 that can be used to open and close the removable lid 24.

Figure 12:
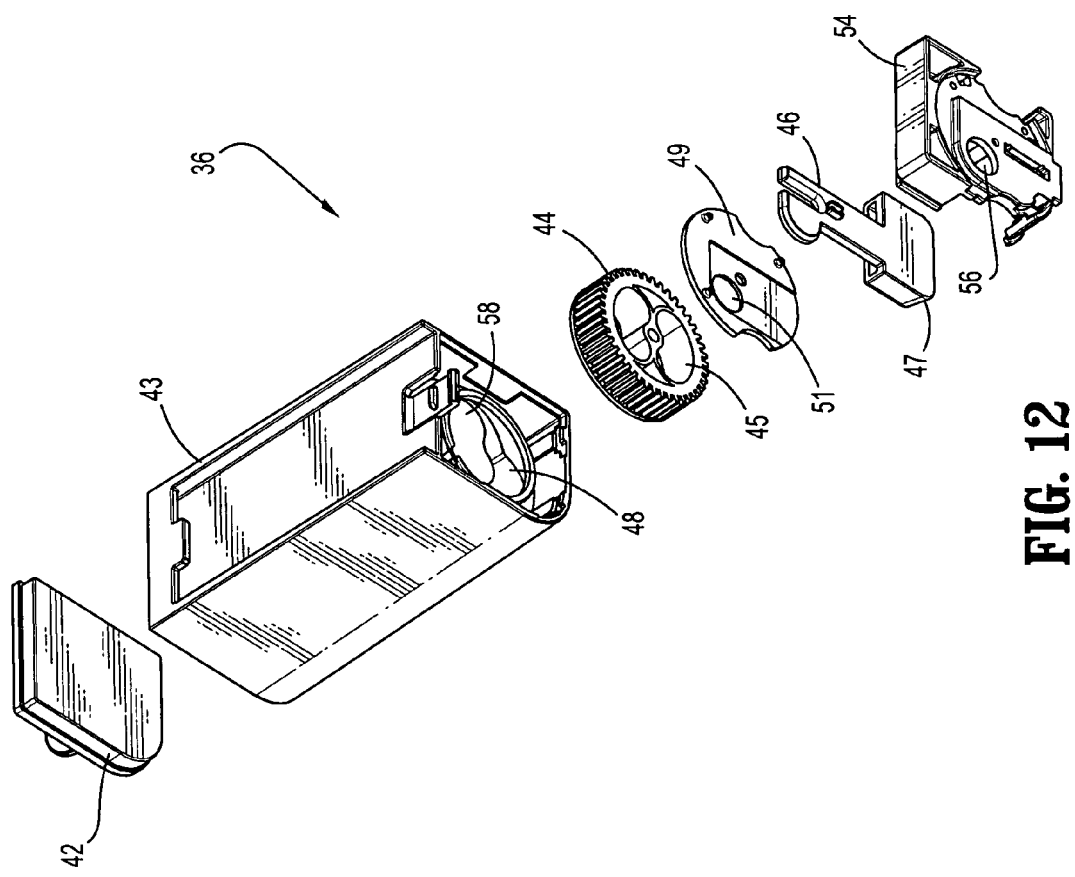
FIG. 12 is an exploded view of a topping dispenser assembly in accordance with an illustrative embodiment of the appliance shown in FIG. 1.

The topping dispensers 36, 38, 40 shown in FIG. 2A are identical and, thus, reference is made to only one of them 36 for this description. Each of the dispensers 36, 38, 40 are removably positioned in the appliance 10. FIG. 12 is an exploded view showing the preferred embodiment of the topping dispenser 36. Each dispenser includes a dispenser housing 43, a removable lid 42, a dispensing gear 44, a sliding tab 46, a dispenser plate 49, a dispenser housing base 54 and a flap 58.

The removable lid 42 can preferably be removed from the dispenser housing to fill it with a food topping. At the bottom of the dispenser housing 43 is located a dispenser housing opening 48 through which the toppings can be made to selectively pass. A dispensing gear 44 having one or more gear holes 45 is rotated by the motor through conventional gearing. The topping dispensers 36, 38, 40 can have gear holes 45 with different size holes in order to accommodate different toppings, whereby each topping dispenser can dispense a topping of a different size, if desired. A sliding tab 46 can be selectively slid out of position by pulling a sliding tab handle 47 in the direction away from the housing 12. This exposes a plate hole 51 in a dispenser plate 49 when it is desired to dispense a topping. A dispenser housing base 54 has a housing base hole 56 that corresponds in position to the plate hole 51. When the sliding tab 46 is slid out of position, the holes 51, 56 line up with the housing opening 48 in the dispenser 36 to enable the toppings to pass through. The inner walls near the bottom of the dispenser housing 43 can be shaped to be curved somewhat inward toward the dispenser housing opening 48 to assist with the transfer of the toppings.

Preferably, a flap 58 can be used at the bottom of the housing opening 48 to run into the toppings and shake them up so that they do not clump together and either slow down the flow of toppings or prevent their passage altogether. The flap 58 can also prevent the toppings from running down after the power is off and additional toppings are no longer desired. In one embodiment, the flap 58 can be in the form of a rubber pad. However, any effective method of various shapes, sizes and materials can be used.

Figure 13:
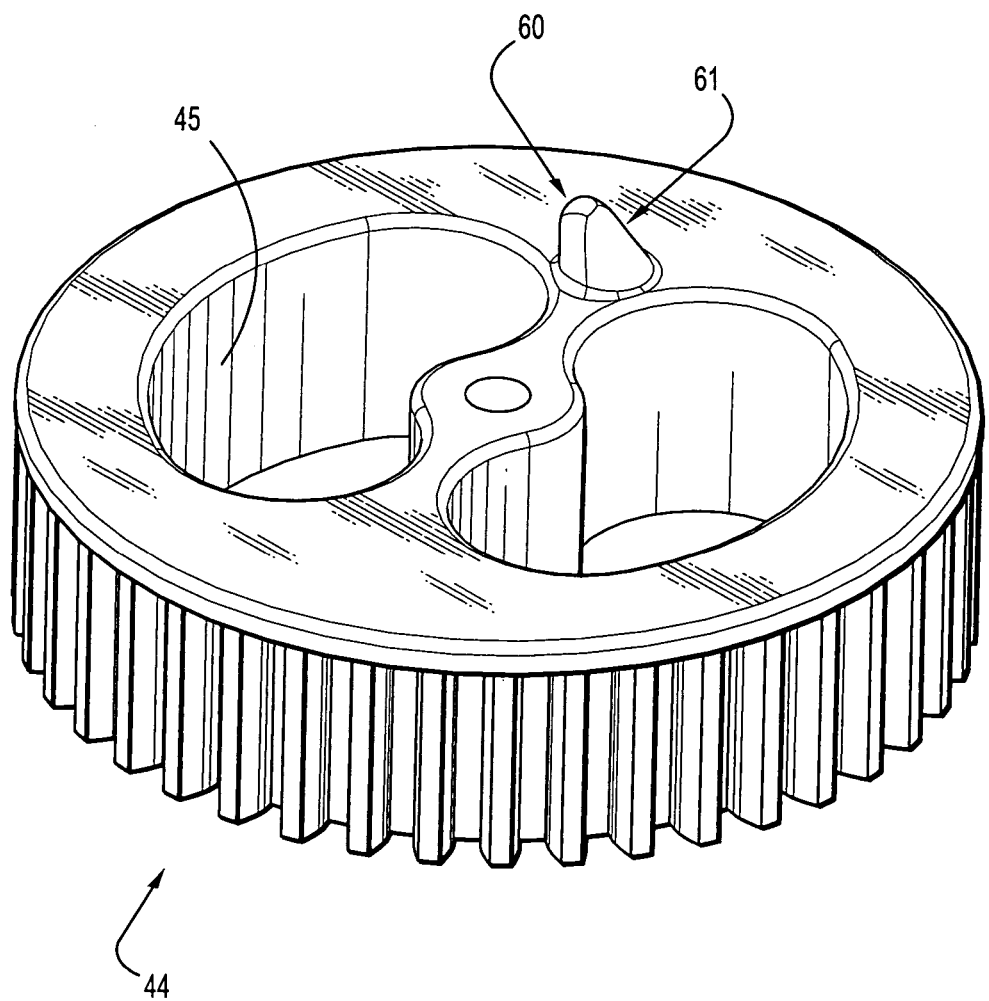
FIG. 13 is a magnified perspective view of a dispensing gear with agitator in accordance with an illustrative embodiment of the appliance shown in FIG. 1.

In a preferred embodiment, an agitator 60, in the form of a protruding bumper, can be located on the dispensing gear 44 to move the flap 58 to increase the effectiveness of the flap running into the toppings. This is shown in FIG. 13. As the dispensing gear 44 rotates, the agitator 60 repeatedly contacts the flap 58 to force the flap into contact with the toppings as they are being transferred. Preferably, the agitator 60 can have a sloped surface 61 on the side that comes into direct contact with the flap 58. This sloped surface can help prevent the flap 58 from folding and/or becoming deformed from the repeated contact with the agitator 60, and thereby losing effectiveness.

Figure 14:
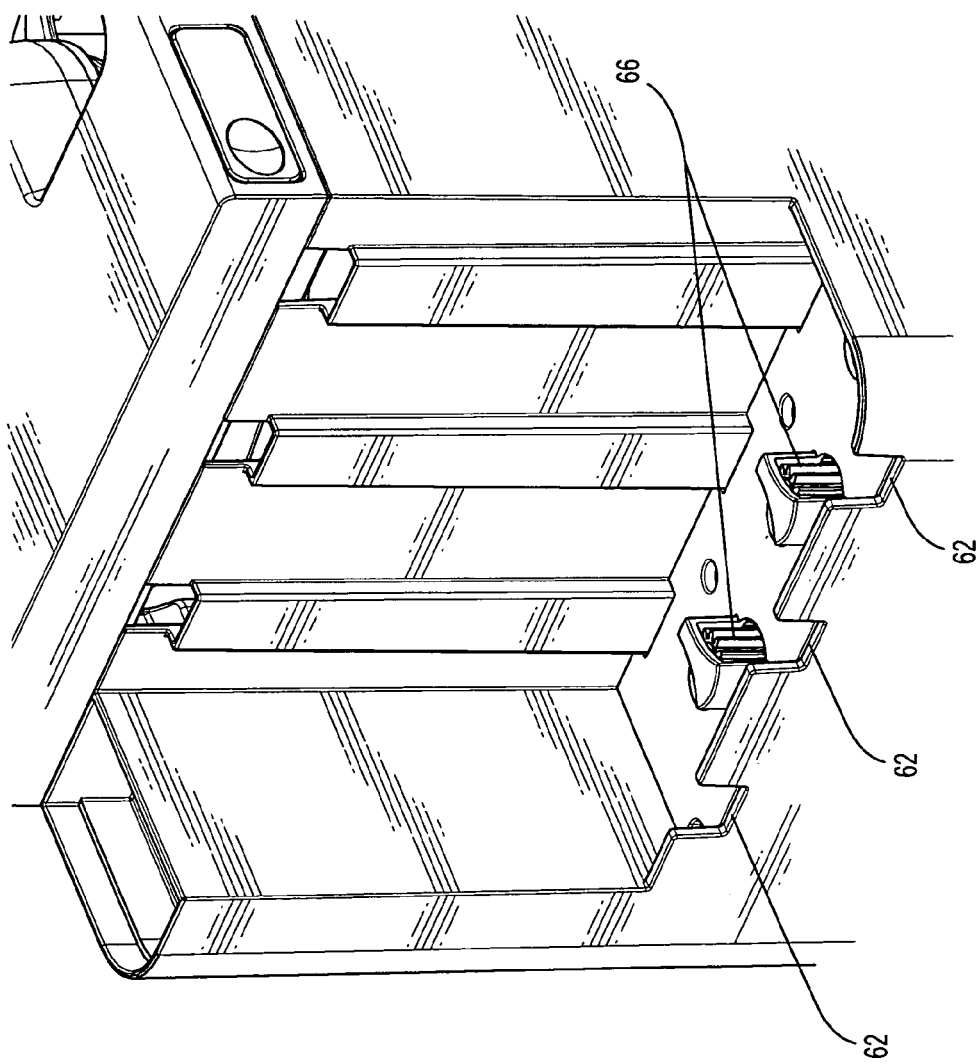
FIG. 14 is a partial perspective view of the housing with the toppings dispensers removed in accordance with an illustrative embodiment of the appliance shown in FIG. 1.
Figure 15:
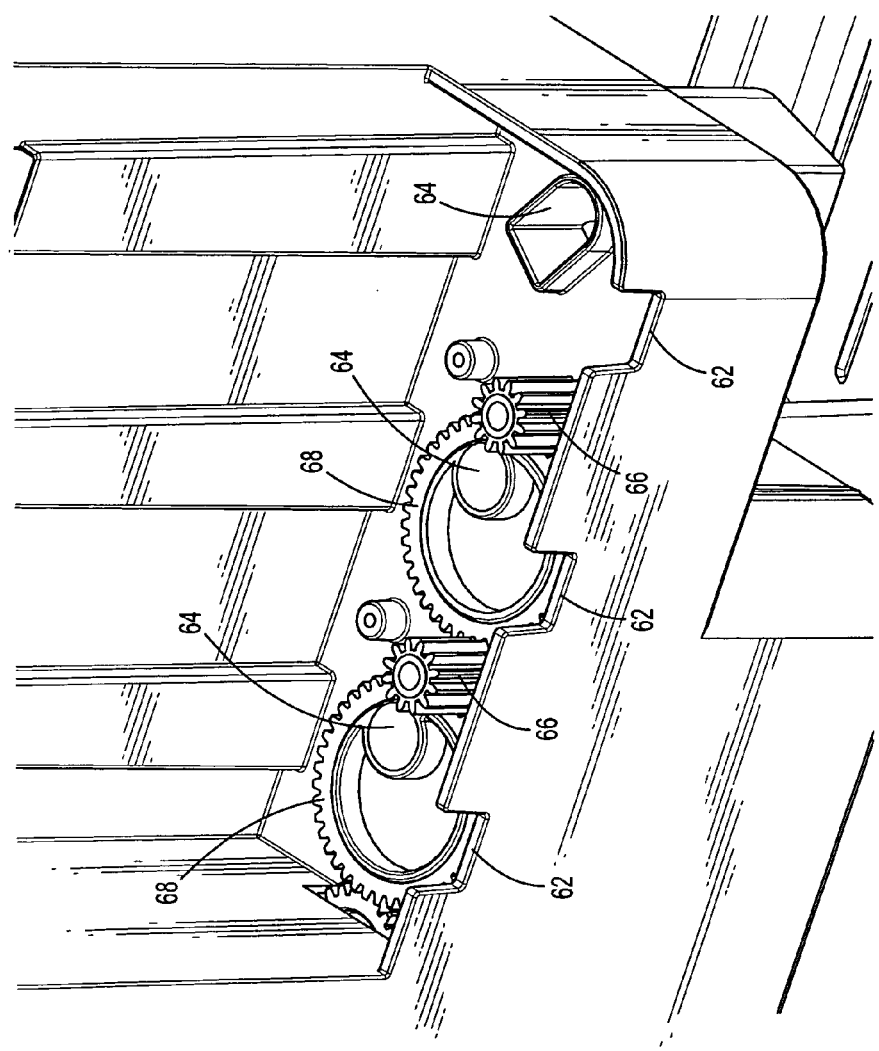
FIG. 15 is a partial perspective view of the housing with the toppings dispensers removed showing the toppings dispenser gearing assembly in accordance with an illustrative embodiment of the appliance shown in FIG. 1.

FIGS. 14 and 15 show close-up views of the area of the housing 12 where the toppings dispensers 36, 38, 40 are located. In a preferred embodiment, the wall of the housing 12 has slots 62 where the sliding tab handles 47 are located. Fixed holes 64 transfer the toppings from the toppings dispensers 36, 38, 40 toward the dispensing nozzle 22. Beneath the toppings dispensers 36, 38, 40 lies a gear system that enables a user to remove one or more of the toppings dispensers 36, 38, 40, and still have the remaining toppings dispenser(s) being operational. Thus, if desired, only one or two of the toppings dispensers 36, 38, 40 could be in place and operational rather than requiring all three to be present. This is accomplished through the use of minor gears 66 and major gears 68, all linked together in a chain. All gears 66, 68 in the chain rotate no matter how many toppings dispensers 36, 38, 40 are in place in the housing 12. As the minor gears 66 rotate, they in turn cause the dispensing gears 44 to rotate, which assist in dispensing the toppings when the sliding tab handles 47 are pulled.

Figure 16:
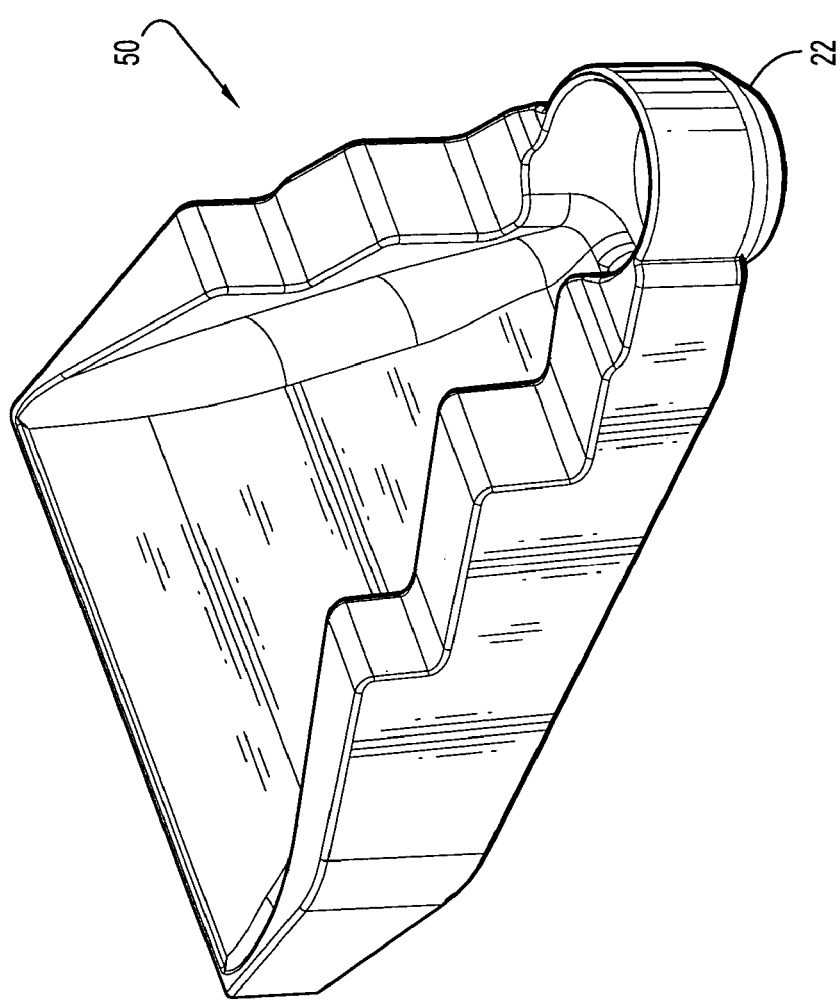
FIG. 16 is a perspective view of the chute in accordance with an illustrative embodiment of the appliance shown in FIG. 1.

As the toppings pass out of the housing opening 48, gear holes 45, plate hole 51 and housing base hole 56, they are directed through a chute 50. One embodiment of the chute 50 can be seen in FIG. 16. The chute 50 directs the flow of the toppings and transfers the dispensed toppings to the dispensing nozzle 22. In one embodiment, the chute 50 can have one or more ribs to redirect the toppings and/or slow the toppings down in order to avoid overshooting the opening for the dispensing nozzle 22. The ice cream and the toppings mix as they leave the dispensing nozzle 22.

Figure 17:
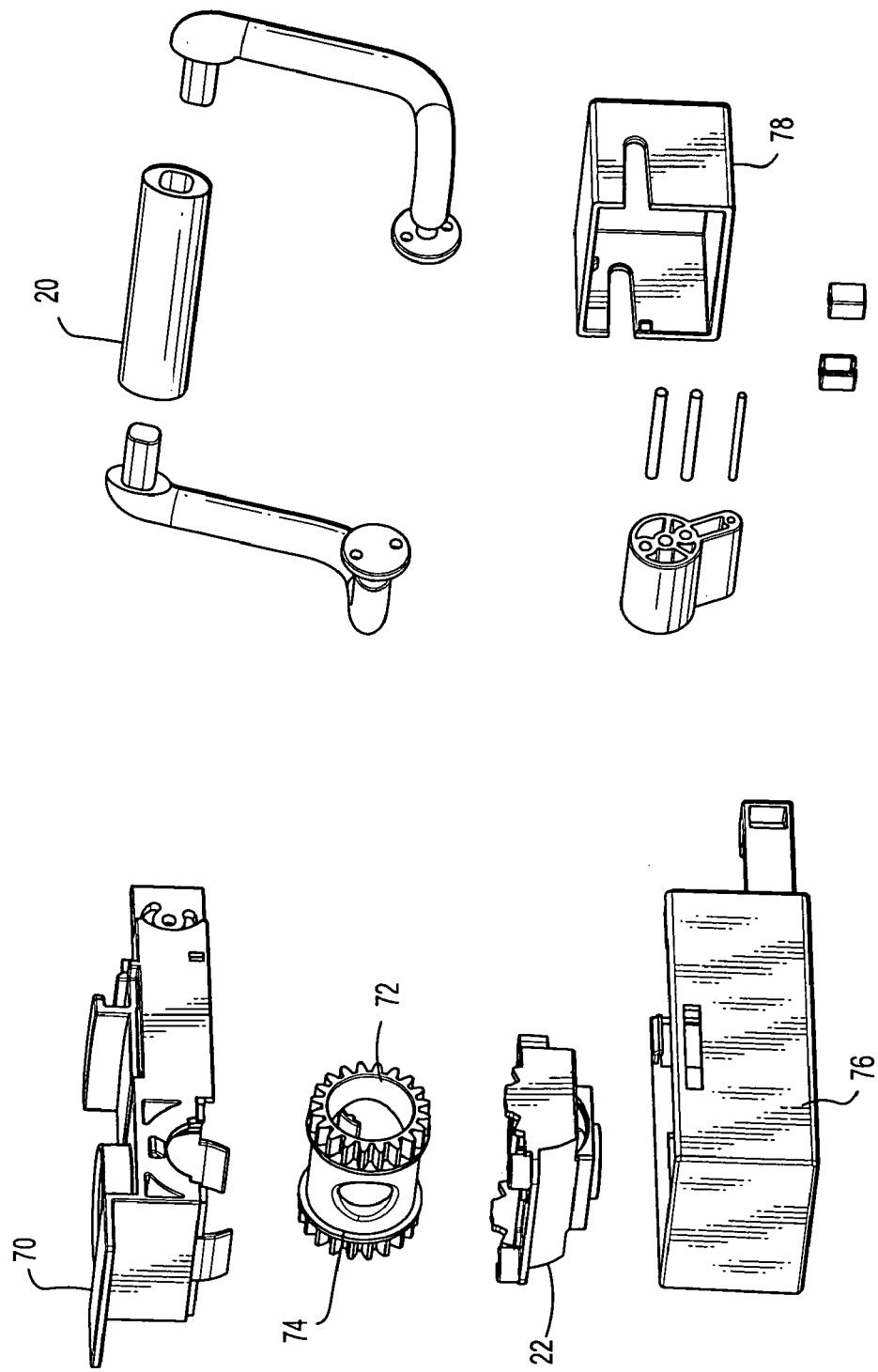
FIG. 17 is an exploded view of the dispensing lever and dispensing nozzle in accordance with an illustrative embodiment of the appliance shown in FIG. 1.

FIG. 17 shows an example of the components for the dispensing lever 20 and associated dispensing nozzle 22 as seen in FIGS. 2A and 2B. These components can include a dispensing bracket 70, a turning drum 72, a sealing ring and/or rubber 74, a sliding plate 76 and an end cap 78. When a user pulls down on the dispensing lever 20, the turning drum 72 with sealing ring 74 rotates so that openings in the dispensing bracket 70, turning drum 72, sealing ring and/or rubber 74, and sliding plate 76 are aligned. This enables the ice cream to flow out of the dispensing nozzle 22 with the assistance of the auger 30. As the lever 20 is pulled down and these openings are aligned, the sliding plate can come into contact with a micro-switch (not shown), which controls the toppings dispensers 36, 38, 40. This enables the toppings to mix into the ice cream.

Figure 18:
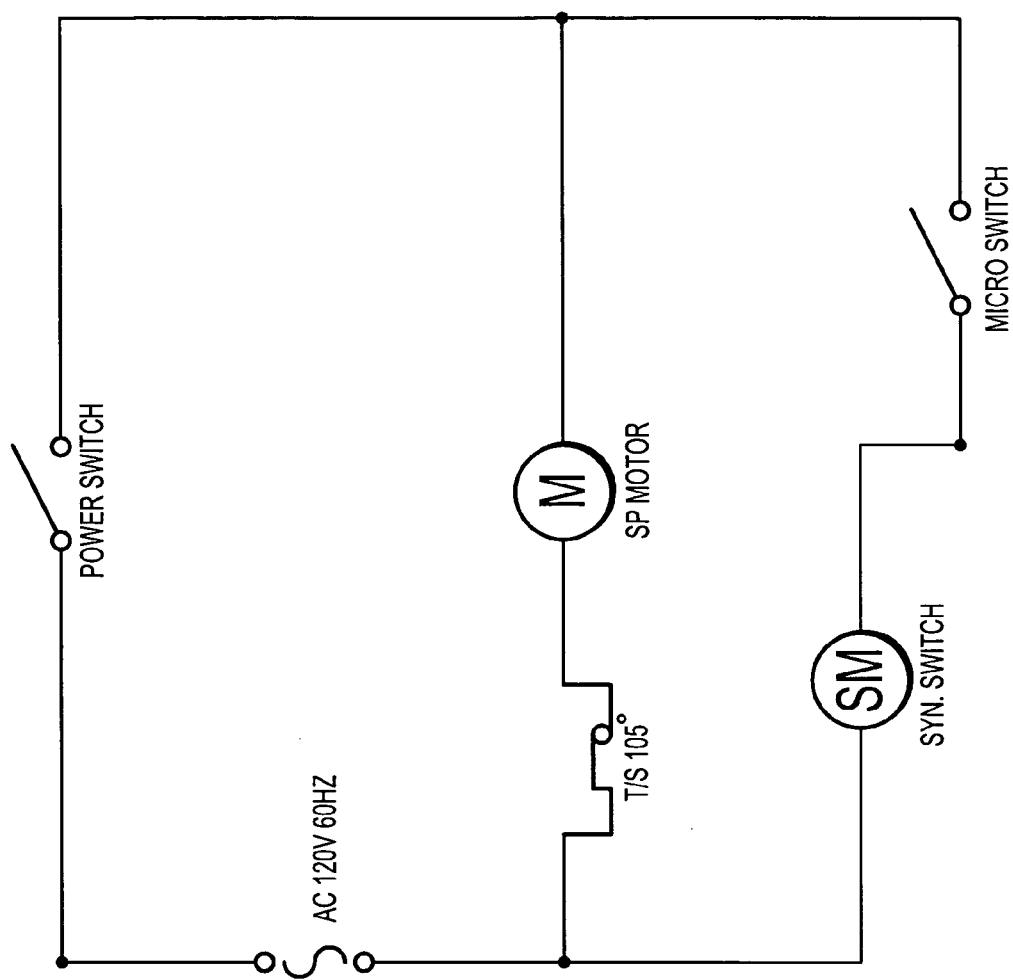
FIG. 18 is an electronic circuit diagram in accordance with an illustrative embodiment of the appliance shown in FIG. 1.

In the preferred embodiment, the motor that drives the blade 28, auger 30, and dispensing gears 44 is an electric motor connected to a conventional electricity source and activated by an on/off switch 52. An example of a circuit diagram for this appliance 10 is shown in FIG. 18.

While a preferred embodiment of the invention has been herein disclosed and described, it is understood that various modifications can be made without departing from the scope of the invention.

What is claimed is:

1. A frozen food appliance comprising:
   a housing;
   a removable container within said housing;
   a frozen food dispensing mechanism for dispensing frozen food; and
   a toppings dispenser for dispensing toppings,
   wherein said frozen foods dispensing mechanism comprises:
      a rotating blade for loosening said frozen food from said removable container;
      a dispensing nozzle for dispensing said frozen food; and
      an auger for directing said frozen food toward said dispensing nozzle, and
   wherein said rotating blade further comprises:
      a scraper for scraping said frozen food from the sides of said removable container; and
      a diverter for directing said frozen food toward said auger.

2. A frozen food appliance according to claim 1, wherein said frozen food dispensing mechanism further comprises a paddle to break up said frozen food within said removable container.

3. A frozen food appliance according to claim 1, further comprising a dispensing lever for activating said dispensing nozzle.

4. A frozen food appliance according to claim 1, wherein said blade and said auger rotate at different speeds.

5. A frozen food appliance according to claim 1, wherein said toppings dispenser is removably connected to said housing.

6. A frozen food appliance according to claim 1, wherein said toppings dispenser further comprises a dispenser housing to hold toppings and a removable lid to enable a user to fill said toppings dispenser with toppings.

7. A frozen food appliance according to claim 1, wherein said removable container comprises an inner portion and an outer portion.

8. A frozen food appliance according to claim 1, further comprising a chute to direct said toppings toward said dispensing nozzle.

9. A frozen food appliance comprising:
   a housing;
   a removable container within said housing;
   a frozen food dispensing mechanism for dispensing frozen food; and
   a toppings dispenser for dispensing toppings, wherein said toppings dispenser further comprises
      a dispenser housing to hold toppings,
      a removable lid to enable a user to fill said toppings dispenser with toppings, and
      a sliding tab to enable a user to selectively transfer said toppings from said toppings dispenser toward said dispensing nozzle.

10. A frozen food appliance comprising:
    a housing;
    a removable container within said housing;
    a frozen food dispensing mechanism for dispensing frozen food; and
    a toppings dispenser for dispensing toppings, wherein said toppings dispenser further comprises
       a dispenser housing to hold toppings,
       a removable lid to enable a user to fill said toppings dispenser with toppings, and
       a gear having a hole in said gear to enable toppings to pass at a generally steady rate.

11. A frozen food appliance according to claim 10, further comprising an agitator on said gear and a flap to prevent said toppings from clumping together as they are being dispensed.

12. A frozen food appliance according to claim 11, wherein said agitator has a sloped surface.

\* \* \* \* \*